US012765533B2

(12) United States Patent
Hainze et al.

(10) Patent No.: US 12,765,533 B2
(45) Date of Patent: Oct. 20, 2026

(54) SOLVENT FOR INSECT REPELLENT ACTIVE INGREDIENT AND INSECT REPELLENT SYSTEM USING SAME

(71) Applicant: Thermacell Repellents, Inc., Bedford, MA (US)

(72) Inventors: John Hainze, Bedford, MA (US); Nicholas Bolz, Bedford, MA (US); Stephen Bradbury, Bedford, MA (US)

(73) Assignee: Thermacell Repellents, Inc., Bedford, MA (US)

( * ) Notice: Subject to any disclaimer, the term of this patent is extended or adjusted under 35 U.S.C. 154(b) by 366 days.

(21) Appl. No.: 18/285,905

(22) PCT Filed: Apr. 6, 2022

(86) PCT No.: PCT/US2022/023736

§ 371 (c)(1),
(2) Date: Oct. 6, 2023

(87) PCT Pub. No.: WO2022/216875

PCT Pub. Date: Oct. 13, 2022

(65) Prior Publication Data

US 2024/0180139 A1 Jun. 6, 2024

Related U.S. Application Data

(60) Provisional application No. 63/171,316, filed on Apr. 6, 2021.

(51) Int. Cl.
*A01M 1/20* (2006.01)
*A01N 25/02* (2006.01)
(Continued)

(52) U.S. Cl.
CPC ........... *A01M 1/2061* (2013.01); *A01N 25/02* (2013.01); *A01N 37/40* (2013.01); *A01P 7/04* (2021.08)

(58) Field of Classification Search
CPC ........ A01M 1/2061; A01P 7/04; A01N 25/02; A01N 37/40
See application file for complete search history.

(56) References Cited

U.S. PATENT DOCUMENTS 6,709,666 B2 3/2004 Kishi et al.
7,201,916 B2 4/2007 Schiavo et al.
(Continued)

FOREIGN PATENT DOCUMENTS

AU 2012200592 A1 * 8/2012 ............. A01N 25/18
CN 11086885 A 3/2020
(Continued)

OTHER PUBLICATIONS

Int'l Search Report and Written Opinion, PCT/US22/23736, dated Jul. 1, 2022, priority filing of U.S. Appl. No. 18/285,905.
(Continued)

*Primary Examiner* — Sean E Conley
(74) *Attorney, Agent, or Firm* — MacMillan, Sobanski & Todd, LLC

(57) ABSTRACT

An insect repellent system includes an active insect repellent ingredient and a glycol solvent as part of a thermally activated dispersion using a wick and a heater. The active ingredient may be a pyrethroid insecticide or a natural insect repellent material. The glycol solvent includes at least two hydroxyl groups and may be a mixture of glycol solvents. In one solvent mixture, a combination of hexylene glycol and dipropylene glycol are combined with a pyrethroid insecticide of either metofluthrin or transfluthrin. The insect repellent system may be a portable insect repellent system formed from thermoplastic materials and rely on battery power to generate heat.

10 Claims, 8 Drawing Sheets

(51) Int. Cl.
*A01N 37/40* (2006.01)
*A01P 7/04* (2006.01)

(56) References Cited

U.S. PATENT DOCUMENTS

| | | | |
|---|---|---|---|
| 10,485,228 | B2 | 11/2019 | Itano et al. |
| 11,350,624 | B2 | 6/2022 | Shapiro et al. |
| 2004/0035409 | A1 | 2/2004 | Harwig et al. |
| 2005/0284952 | A1 | 12/2005 | Davis et al. |
| 2014/0362560 | A1 | 12/2014 | Formico et al. |
| 2018/0064101 | A1 | 3/2018 | Sugioka et al. |
| 2018/0207309 | A1 | 7/2018 | Salowitz et al. |
| 2019/0014769 | A1 | 1/2019 | Itano et al. |

FOREIGN PATENT DOCUMENTS

| | | | |
|---|---|---|---|
| EP | 3566578 | A1 | 11/2019 |
| JP | 2001131002 | A | 5/2001 |
| WO | 2020085473 | A1 | 4/2020 |

OTHER PUBLICATIONS

European extended search report, supplemental search and search opinion, dated Feb. 10, 2025 of European counterpart application to U.S. Appl. No. 18/285,905.
JP2001131002 English translation annexed to the European Search report of EP22785404.9, Feb. 10, 2025.
WO2020/085473 English translation annexed to the European Search report of EP22785404.9, Feb. 10, 2025.
Chinese Office Action of CN202280033731.9, counterpart application of U.S. Appl. No. 18/285,905, dated Jul. 17, 2025 and English translation.

* cited by examiner

Table 1. Identity and physical properties of tested glycol solvents

| # | Glycol Solvent Name | CAS # | Density (g/cm³) | Boiling Point or Range (°C) | Dynamic Viscosity at 20°C or 25°C (cP) | Molecular Formula ($C_xH_yO_z$) | Molecular Weight (g/mol) | Molecular Structure |
|---|---|---|---|---|---|---|---|---|
| 1 | Ethylene glycol | 107-21-1 | 1.11 | 197 | 21 | $C_2H_6O_2$ | 62.07 |  |
| 2 | Propylene glycol | 57-55-6 | 1.04 | 188 | 42 | $C_3H_8O_2$ | 76.09 | 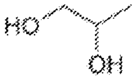 |
| 3 | Hexylene glycol | 107-41-5 | 0.92 | 197 | 34 | $C_6H_{14}O_2$ | 118.17 | 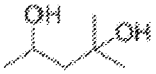 |
| 4 | Diethylene glycol | 111-46-6 | 1.11 | 245 | 30 | $C_4H_{10}O_3$ | 106.12 |  |
| 5 | Dipropylene glycol | 25265-71-8 | 1.02 | 229-232 | 84 | $C_6H_{14}O_3$ | 134.17 | 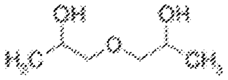 |
| 6 | Triethylene glycol | 112-27-6 | 1.12 | 285 | 48 | $C_6H_{14}O_4$ | 150.17 | 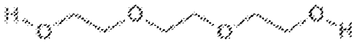 |
| 7 | Tripropylene glycol | 24800-44-0 | 1.02 | 271 | 84 | $C_9H_{20}O_4$ | 192.25 | 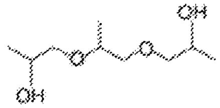 |
| 8 | Tetraethylene glycol | 112-60-7 | 1.12 | 324-330 | 62 | $C_8H_{18}O_5$ | 194.22 |  |
| 9 | 2-Ethylhexane-1,3-diol | 94-96-2 | 0.94 | 243 | 323 | $C_8H_{18}O_2$ | 146.23 | 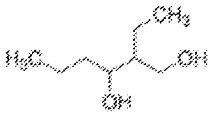 |
| 10 | Glycerol | 56-81-5 | 1.21 | 290 | 1070 | $C_3H_8O_3$ | 92.09 |  |

Fig. 4

Table 2. Identity and physical properties of tested glycol-related solvents

| # | Glycol-Related Solvent Name | CAS # | Density (g/cm³) | Boiling Point or Range (°C) | Dynamic Viscosity at 20°C or 25°C (cP) | Molecular Formula ($C_xH_yO_z$) | Molecular Weight (g/mol) | Molecular Structure |
|---|---|---|---|---|---|---|---|---|
| 1 | Diethylene glycol methyl ether | 111-77-3 | 0.95 | 190 | NA | $C_5H_{12}O_3$ | 120.15 | 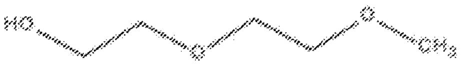 |
| 2 | Dipropylene glycol methyl ether | 13588-28-8 | 0.95 | 184 | NA | $C_7H_{16}O_3$ | 148.20 | 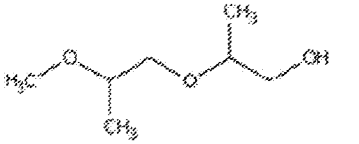 |
| 3 | Dipropylene glycol propyl ether | 29911-27-1 | 0.92 | 212 | 4.7 | $C_9H_{20}O_3$ | 176.25 | 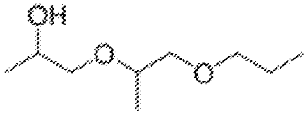 |
| 4 | Dipropylene glycol methyl ether acetate | 88917-22-0 | 0.98 | 290 | 1.7 | $C_9H_{18}O_4$ | 190.24 | 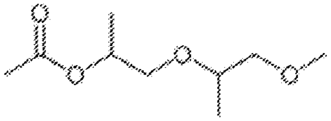 |
| 5 | Tripropylene glycol methyl ether | 25498-49-1 | 0.97 | 242 | NA | $C_{10}H_{22}O_4$ | 206.28 | 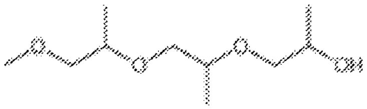 |
| 6 | Isopropylidene glycerol | 100-79-8 | 1.07 | 191 | 11 | $C_6H_{12}O_3$ | 132.16 | 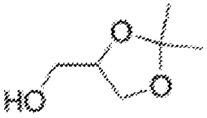 |

Fig. 5

Table 3. Pyrethroid solubility in tested glycol solvents

| # | Glycol Solvent Name | Metofluthrin | Prallethrin | Transfluthrin |
|---|---|---|---|---|
| 1 | Ethylene glycol | Y | N | ND |
| 2 | Propylene glycol | Y | N | ND |
| 3 | Hexylene glycol | Y | Y | Y |
| 4 | Diethylene glycol | Y | N | ND |
| 5 | Dipropylene glycol | Y | Y | ND |
| 6 | Triethylene glycol | Y | N | ND |
| 7 | Tripropylene glycol | Y | Y | ND |
| 8 | Tetraethylene glycol | Y | Y | ND |
| 9 | 2-Ethylhexane-1,3-diol | Y | Y | ND |
| 10 | Glycerol | Y | ND | ND |

Y = Yes, soluble; N = No, not soluble; ND = Not determined

Fig. 6

Table 4. Pyrethroid solubility in tested glycol-related solvents

| # | Glycol-Related Solvent Name | Metofluthrin | Prallethrin | Transfluthrin |
|---|---|---|---|---|
| 1 | Diethylene glycol methyl ether | ND | ND | ND |
| 2 | Dipropylene glycol methyl ether | ND | ND | ND |
| 3 | Dipropylene glycol propyl ether | Y | ND | ND |
| 4 | Dipropylene glycol methyl ether acetate | ND | ND | ND |
| 5 | Tripropylene glycol methyl ether | ND | ND | ND |
| 6 | Isopropylidene glycerol | Y | Y | ND |

Y = Yes, soluble; N = No, not soluble; ND = Not determined

Fig. 7

Table 5. Device component compatibility and vaporization rate with tested glycol solvents

| # | Glycol Solvent Name | Acrylonitrile butadiene styrene (ABS) | Polycarbonate | Nitrile rubber | Composite (Wick Swelling) | Vaporization Rate (mg/hour) |
|---|---|---|---|---|---|---|
| 1 | Ethylene glycol | N | N | N | R | 92 |
| 2 | Propylene glycol | N | N | N | R | 110 |
| 3 | Hexylene glycol | N | N | N | N | 108 |
| 4 | Diethylene glycol | ND | ND | ND | ND | ND |
| 5 | Dipropylene glycol | N | N | N | R | 62 |
| 6 | Triethylene glycol | ND | ND | ND | ND | 41 |
| 7 | Tripropylene glycol | N | N | N | ND | ND |
| 8 | Tetraethylene glycol | N | N | N | R | 35 |
| 9 | 2-Ethylhexane-1,3-diol | N | N | N | R | 37 |
| 10 | Glycerol | N | N | N | N | 29 |

R = Reactivity observed, not compatible;N = No reactivity observed, compatible; ND = Not determined

Fig. 8

Table 6. Device component compatibility and vaporization rate with tested glycol-related solvents

| # | Glycol-Related Solvent Name | Acrylonitrile butadiene styrene (ABS) | Polycarbonate | Nitrile rubber | Composite (Wick Swelling) | Vaporization Rate (mg/hour) |
|---|---|---|---|---|---|---|
| 1 | Diethylene glycol methyl ether | ND | ND | R | ND | ND |
| 2 | Dipropylene glycol methyl ether | ND | ND | R | ND | ND |
| 3 | Dipropylene glycol propyl ether | R | NR | NR | ND | ND |
| 4 | Dipropylene glycol methyl ether acetate | R | R | ND | ND | ND |
| 5 | Tripropylene glycol methyl ether | ND | ND | ND | ND | ND |
| 6 | Isopropylidene glycerol | R | ND* | ND* | ND | ND |

R = Reactivity observed, not compatible;N = No reactivity observed, compatible; ND = Not determined
*Not determined because test was terminated early (after 1 hour) due to severe ABS reactivity. Incompatibility was typically evaluated after testing exposure up to hours.

Fig. 9

SOLVENT FOR INSECT REPELLENT ACTIVE INGREDIENT AND INSECT REPELLENT SYSTEM USING SAME

CROSS-REFERENCE TO RELATED APPLICATIONS

This application claims the benefit of U.S. Provisional Application No. 63/171,316, filed Apr. 6, 2021, the disclosure of which is incorporated herein by reference.

BACKGROUND OF THE INVENTION

This invention relates in general to spatially dispersed insect repellents and in particular to a solvent medium for facilitating dispersion of an insect repellent active ingredient.

Spatial mosquito repellents, consisting of airborne chemicals that kill or repel mosquitoes in a proscribed area, are often preferred to rubbing mosquito repellents onto human skin. The most common method of generating concentrations of mosquito repellent in the air is through the use of energy—most often heat energy. That heat can be generated chemically or electrically. Electrical heat may be acquired using electricity from a cord attached to a power outlet or by battery power. The amount of heat produced by a battery results in a power draw that affects the life of the battery. More heat requires a greater draw and results in shorter battery life. For a spatial repellent to be useful, batteries must last long enough to protect a user for the time they spend outdoors in the presence of mosquitoes. Therefore, temperatures achieved in a battery-powered device are necessarily lower than in a corded device plugged into a power source.

Spatial repellents come in a variety of forms. Many, such as mosquito coils and paper mats, are made for a single use occasion. Another form, the liquid evaporator, involves a liquid receptacle and a wick through which the liquid is drawn for evaporation at its tip. In this design, the duration of the refill is limited mainly by the volume of liquid it contains. Typically, the liquid in the formula contains an active ingredient and a petroleum distillate used to dissolve that ingredient. One problem with such a formula is that the petroleum distillate may cause chemical pneumonitis should a child drink some of the liquid and inhale it. Many hydrocarbons and petroleum distillates are considered aspiration hazards. Thus, what is needed is a safer solvent that is compatible with insect repellent active ingredients and refill container materials. Glycol solvents, on the other hand, have chemical and physical properties that place them outside the criteria for aspiration hazards.

Products combining hydrocarbon solvents with insect repellents and a wick to generate mosquito spatial repellency are known in the art. Aspiration hazards of such a product, however, requires warnings on the label and child resistant packaging in some jurisdictions. U.S. Pat. No. 10,485,228 teaches use of a water-based formula, incorporating glycol ethers in the formula, as an alternative to hydrocarbon formulas. This formulation requires water, glycol ether, and active ingredient in concentrations between 0.1% and 3.0% to reliably dispense the formula. As stated in the '228 Patent, those low concentrations of active ingredient have "a practical efficacy in indoor spaces such as living rooms, lounges, bedrooms, and the like . . . ." Yet, to achieve greater efficacy of spatial repellents in outdoor settings, higher active ingredient levels are needed in order to overcome outdoor environmental factors, such as breeze and a general lack of spatial containment. A water-based formula limits the ratio of active ingredient to solvent reducing dispersion capacity and potentially increasing volatilization heat inputs.

As discovered by the inventors, use of glycols as a solvent, rather than glycol-ethers or other related glycol-based solvents allow dispersal of higher percentages of active ingredient, demonstrated to be as high as 27% or higher, and solves certain other problems, such as material compatibility, presented by glycol ethers and the aspiration hazard caused by hydrocarbon solvents. Higher ingredient percentages may be near 40%.

SUMMARY OF THE INVENTION

An insect repellent system comprises a heating element, a reservoir, and a wick. The reservoir contains a mixture of an active insect repellent ingredient and a glycol solvent. The wick has a proximal end extending into the heating element and a distal end extending into the mixture. In certain embodiments, the active insect repellent ingredient is a pyrethroid insecticide or a combination of pyrethroids (e.g. metofluthrin and prallethrin. In certain aspects of those embodiments, the pyrethroid insecticide may preferably be one of metofluthrin or transfluthrin. In other embodiments, the active insect repellent ingredient is a natural insect repellent such as at least one of Lemon eucalyptus oil, Lavender, Cinnamon oil, Thyme oil, Greek catmint oil, Soybean oil, Citronella, Tea tree oil, Geraniol, or Neem oil.

The glycol solvent of the various embodiments of the insect repellent system may be one of ethylene glycol, propylene glycol, hexylene glycol, diethylene glycol, dipropylene glycol, triethylene glycol, tripropylene glycol, or tetraethylene glycol solvents. In conjunction with the pyrethroid insecticides, in certain embodiments the glycol solvent is a mixture of at least a first glycol solvent and a second glycol solvent wherein the first glycol solvent has a boiling point lower than the second glycol solvent. Where the glycol solvent is a mixture of first and second solvents, one embodiment of the glycol mixture may be a mixture of hexylene glycol and dipropylene glycol. In an aspect of this embodiment, the ratio of hexylene glycol to dipropylene glycol may be in a ratio of about 70% to about 30%. In certain aspects of the embodiments having a mixture of hexylene and dipropylene glycol solvents, the ratios may be formulated as a ratio of hexylene glycol to dipropylene glycol in a range of 65-70 percent hexylene glycol to 35-30 percent dipropylene glycol. Alternatively, the ratio range may be a range of 60-70 percent hexylene glycol to 40-30 percent dipropylene glycol.

In certain embodiments of the insect repellent system, the device is configured as a portable insect repellent system powered by a battery. The heating element may have a power output in a range of about 3 Watts to about 4 Watts and the battery may have a charge capacity of about 2900 mAh to about 3200 mAh. In certain other embodiments, the heating element produces a temperature output in a range sufficient for low voltage battery operation, which may range from about 60 degrees Celsius to about 140 degrees Celsius.

In any of the embodiments of the insect repellent system described herein, the housing and the reservoir may be formed from thermoplastic materials. In one aspect, the housing thermoplastic material is an acrylonitrile butadiene styrene (ABS) plastic and a portion of the reservoir is formed from a polycarbonate plastic. The reservoir may further include a sealing element, such as a nitrile rubber seal that engages the wick which may be configured as an O-ring.

This invention relates to solvents for dissolving insect repellents to permit dispersion of an insect repellent active ingredient, including for example pyrethroids such as d-allethrin, prallethrin, transfluthrin, and metofluthrin, natural oils or other natural ingredients, saltidin, and para-menthane-3,8-diol, with a reduced temperature requirement. In one embodiment, a glycol-based solvent has been found to be compatible with insect repellent active ingredients, such as metofluthrin, to volatilize a spatial insect repellent formula within a heat range sufficient for low voltage battery operation, which may range from 60-140 C. In one embodiment, the low voltage battery is a lithium ion battery, though any battery energy storage unit may be used and remain within the scope of the invention. In one configuration, the lithium ion battery may be sized in a range of about 2900 mAh to about 3200 mAh though larger or smaller battery sizes or multiple batteries may be used. In this configuration, the battery may have a charge capacity based on an electrical input source of about 5 volts DC and about 1000 mA. A heater associated with the battery and configured to volatize the active ingredient and glycol mix may draw in a range of 3-4 Watts of power. Such a battery may deliver a usage time, before requiring recharging, of up to 6 hours, which is an appropriate time frame for an evening of mosquito protection.

These insect repellent products may protect human beings and their pets from a range of biting insects, including mosquitoes from the insect family Culicidae, black flies from the insect family Simulidae, sand flies from the insect family Psychodidae, biting midges from the insect family Ceratopogonidae and other troublesome flying or crawling arthropods.

Though Metofluthrin alone may be volatile at room temperature, influences of the delivery system affect the concentration of material that can be effectively delivered. The specific formulation is therefore a product of the surface area of the delivery device and the temperature of the material. If a large enough surface area could be provided, a sufficient amount of metofluthrin can be supplied in the air to repel and possibly kill mosquitoes. However, such a surface area requirement would yield an unwieldy and impractical delivery system. With a smaller substrate, some form of energy input is needed to provide an efficacious amount of active ingredient to repel insects, such as mosquitoes. The energy input may be in the form of forced air, heat, or a combination of both. In order to provide a suitable package size that is unobtrusive yet effective, the distribution device is characterized as a wick, preferably formed in a size rage of about 2 mm to about 8 mm in diameter and more preferably in a size of about 5 mm. Such wicks gradually draw the liquid formula to its tip where it is heated to release the active ingredient into the air in the form of vapors and small particles, referred to as volatilization. The exposed area of the wick positioned proximate to the heater and the capillary action capacity (porosity) of the wick material effect the volatilization rate of material into the surroundings. In one embodiment, the wick is sized with a 3-4 Watt heating element to provide metofluthrin or other repellents in a sufficient amount, up to 27% active ingredient level, to minimize or eliminate insects, in particular mosquitos, in an area of about 15-25 feet in diameter, and in a specific range of about 20 feet in diameter. Such a combination of metofluthrin and glycol solvent can be volatized to create the insect-free (or reduced) space with a lithium ion battery life above of about 6 hours.

The inventors have found that use of glycol as a solvent agent for metofluthrin is compatible with a heating element described above to provide an efficacious amount of metofluthrin to create a 20 foot zone of mosquito repellency. The inventors have also found that certain glycol solvents are more effective solubilizers for insect repellent active materials. Without being bound to theory, the effectiveness of certain glycol solvents may be based in part on chemical polarity and lower molecular weight. The glycol formulations suitable to dissolve the active ingredient are able to travel up the wick, and to vaporize when heated at the tip of the wick. These glycol formulations combine these multiple properties to work in the product. For example, in order to solubilize typical active ingredients, such as pyrethroid insecticides (which may also function as repellents to insects), the glycol formulations tested can provide sufficient molecular weight and chemical polarity or other chemical/physical characteristics to dissolve the material and permit volatilization within the target heat output limits. Typical active ingredient concentrations needed to provide sufficient outdoor mosquito repellency may vary from 4% metofluthrin to 27% transfluthrin in different embodiments.

The wick characteristics place limits on the viscosity of the glycol that enable it to travel through the pores in the wick at a rate that allow release of the active ingredient at a rate sufficient to repel mosquitoes. There is thus an interaction between wick and solvent characteristics. Typical wicks used in testing these formulas were of composite construction, including ingredients such as polyethylene terephthalate or acrylic compounds, or of ceramic construction. Wick porosity may range from 40 to 70% and density from 0.40 to 0.80 $mg/mm^3$. The glycols tested demonstrate a high enough vapor pressure or low enough boiling point to vaporize at the tip of the wick where it encounters the relatively lower battery-powered heat generated by the device. In certain embodiments, a combination of glycols may provide the properties necessary to deliver the desired rate of active ingredient release. In one embodiment, a 70:30 combination of hexylene glycol and dipropylene glycol is effective in releasing the active ingredient at an effective rate through wicks with a density of 0.45-0.55 $mg/mm^3$.

A further constraint on the choice of solvent is the interaction of the solvent with bottle and heater components. For example, glycol ethers were variously found to be incompatible with acrylonitrile butadiene styrene, polycarbonate, and nitrile materials that are typically used in these products. Certain glycols exhibited incompatibility with the composite wicks, also narrowing the list of acceptable solvents, although this can be mitigated by combination with non-reactive glycols.

Thus, glycol solvents deliver the solvency to incorporate insect repellent ingredients at higher levels to improve product efficacy and particularly to allow effective use of the product to repel mosquitoes outdoors, while not creating an aspiration hazard. There is an interplay among multiple factors in choosing a glycol solvent or solvent combination including solvency, appropriate release rate through the wick, device temperature requirements, and compatibility with components of the refill structure and device. A specific glycol or glycol combination, such as the 70:30 combination of hexylene glycol and dipropylene glycol, must be satisfactory in each of these tested categories.

Various aspects of this invention will become apparent to those skilled in the art from the following detailed description of the preferred embodiment, when read in light of the accompanying drawings.

BRIEF DESCRIPTION OF THE DRAWINGS

FIG. 4 is a table of test data showing physical and chemical properties of glycol solvents tested. test data showing compatibility of a dispensing device with listed glycol solvents.

FIG. 5 is a table of test data showing physical and chemical properties of glycol-related and glycol ether solvents tested.

FIG. 6 is a table of test data showing the solubility of select Pyrethroid active ingredients in glycol solvents.

FIG. 7 is a table of test data showing the solubility of select Pyrethroid active ingredients in glycol-related solvents.

FIG. 8 is a table of test data showing compatibility and vaporization rates of the dispensing device with glycol solvents.

FIG. 9 is a table of test data showing compatibility and vaporization rates of the dispensing device with glycol-related solvents.

DETAILED DESCRIPTION OF THE PREFERRED EMBODIMENT

As referred to and described herein, the term "glycol" refers to organic compounds with two hydroxyl (—OH) groups attached to different carbon atoms of a molecular chain, including glycerol that contains 3 hydroxyl groups. Furthermore, as referred to and described herein, the term "glycol-related" compounds are organic compounds that may have a similar chemical structure to glycols where one or more of the hydroxyl groups have been transformed or modified (e.g. glycol ether, glycol ester, or glycol acetate) with one of an ether group (an oxygen atom connected to two alkyl or aryl groups), an ester group (a hydroxyl group modified to become an oxygen-alkyl group), or acetyl group.

Figure 2:
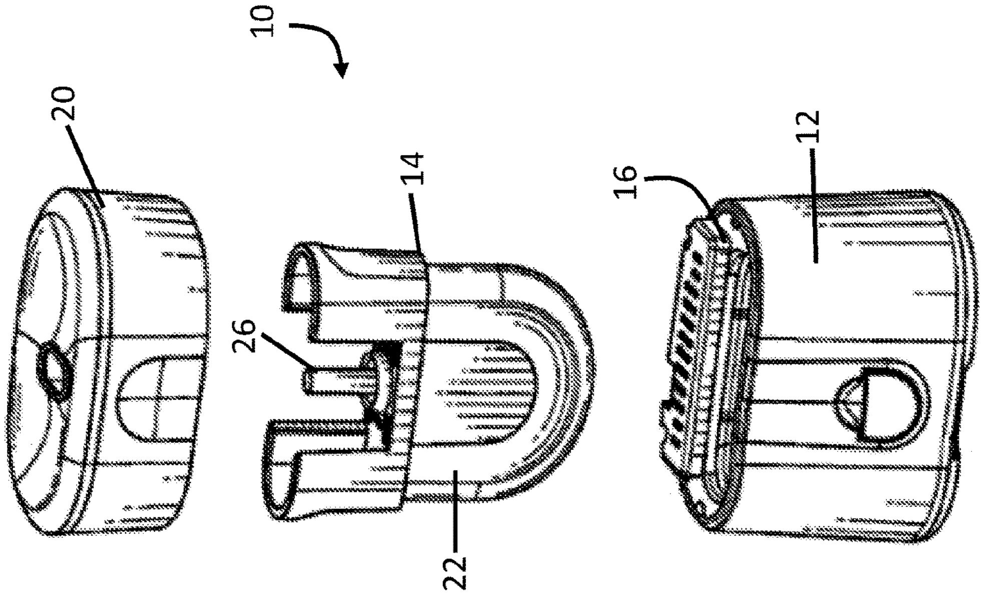
FIG. 2 is an exploded view of the dispensing device of FIG. 1.
Figure 1:
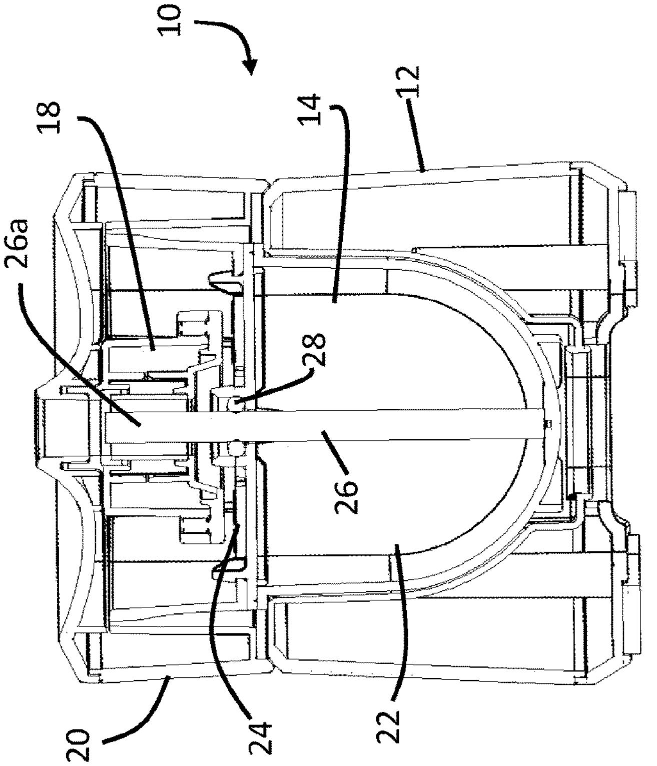
FIG. 1 is a cross sectional view of a dispensing device utilizing an insect repellent solution in accordance with the invention.
Figure 3:
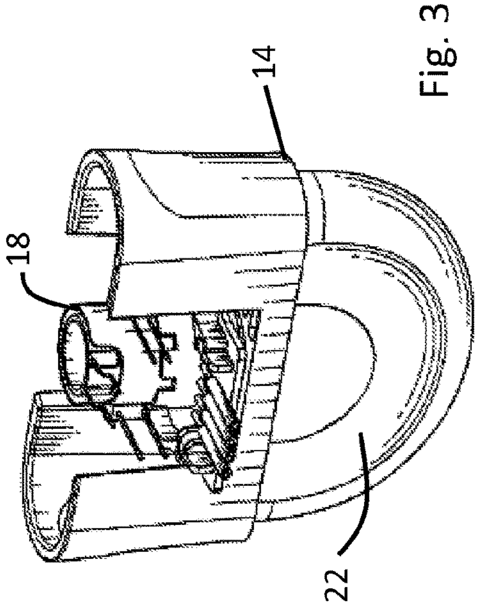
FIG. 3 is an enlarged view of a heating element proximate to a wick position of the dispensing device of FIG. 1.
Figure 10:
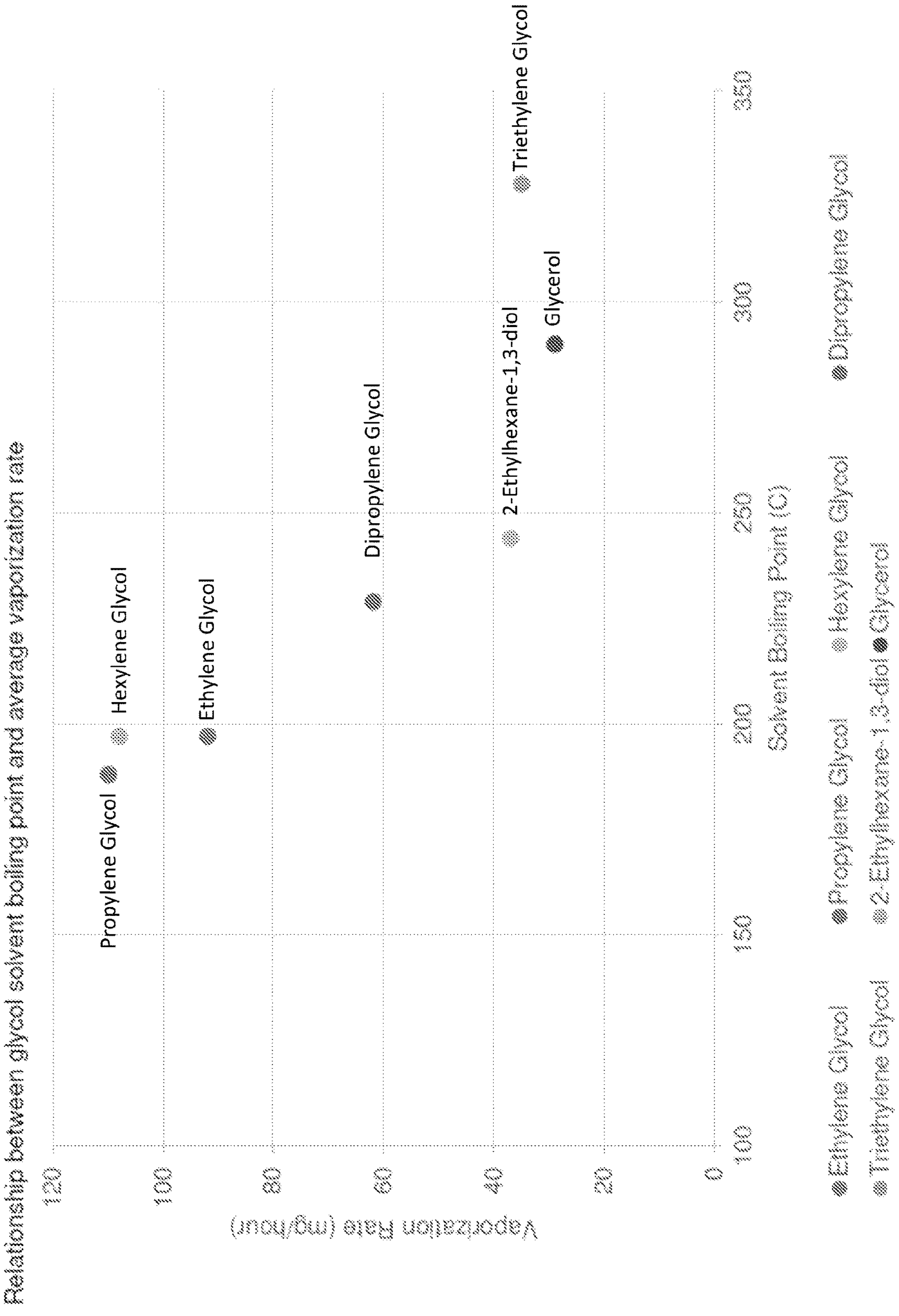
FIG. 10 is a graph of glycol solvent boiling point vs. average vaporization rates.

Referring now to the drawings, there is illustrated in FIGS. 1-3 an insect repeller, shown generally at 10. The repeller 10 is presented as an example of an insect repellent dispenser utilizing a repellent formulation in accordance with the invention and may be configured in other forms. The repeller 10 includes a base 12 that locates and supports a repellent reservoir 14 and a power source 16, configured as a rechargeable battery, capable of powering a heating element 18. In one embodiment, the heating element may be a cylindrical heating element having a power output of about 3-4 Watts. The heating element 18 may be supported within a cover 20, though the heating element may also be supported on the base 12 or as part of a separate housing structure (not shown). The cover 20 may provide electrical contact between the battery 16 and the heating element 18. In one embodiment, the base and cover may be formed from a thermoplastic such as Acrylonitrile Butadiene Styrene (ABS) plastic.

The repellent reservoir 14 includes a fluid containment vessel portion or bottle 22. In one embodiment, the bottle 22 is formed from a thermoplastic such as polycarbonate. The reservoir 14 includes a top portion 24 that supports a wick 26 and a sealing structure 28, configured in one embodiment as a nitrile O-ring. The chemical compatibility of the various structural component materials with the repellent formulation, and fluid uptake compatibility of the formulation with the wick structure are influential in developing a commercially viable and efficacious insect repeller device. The wick 26 may be configured as a fibrous, capillary structure formed from natural or artificial fibers or formed from composite or ceramic materials including sintered materials. Typical wicks used in testing the various formula embodiments were of composite construction, including ingredients such as polyethylene terephthalate, acrylic compounds, or ceramics. In one embodiment, the porosity of the wick may be in a range of 40 to 70% and density from 0.40 to 0.80 $mg/mm^3$. In another embodiment, the wick porosity may be in a range of 50-60% and have a density of 0.55-0.65 $mg/mm^3$. The influence of wick characteristics is balanced with the viscosity of the glycol, solubility of active ingredient in the selected glycol solvent, and the concentration of active ingredient. These factors are balanced with the level of heat output to provide a formulation that enables it to travel through the pores in the wick and vaporize at a rate to create a concentration of active ingredient sufficient to repel mosquitoes.

As shown in FIG. 1, the exposed area of the wick 26 is positioned proximate to and generally within the heater 18. As heat is applied to a wick end **26*a*** proximate to the heater, the formula contained in that area is volatized and the active ingredient emitted into the surrounding area. As the material leaves the wick, a pressure differential created by exiting material permits the capillary action to draw more fluid up towards the wick proximate end. The amount of heat radiant energy available to volatize the formula is an influential factor, particularly in the context of a portable insect repeller device. In order to create a commercially-viable, portable repeller device, unit size, battery charge life, and heater output are designed in consideration of the formulation properties. Because of demonstrated effectiveness and regulatory acceptance, synthetic pyrethroids such as, for example, metofluthrin and transfluthrin are good candidates for the repellent portion of the formula. Alternatively, other synthetic or natural repellent materials may be used. For example, natural repellent materials such as Lemon eucalyptus oil, Lavender, Cinnamon oil, Thyme oil, Greek catmint oil, Soybean oil, Citronella, Tea tree oil, Geraniol, or Neem oil may be used.

Through significant research and testing, as evidenced in the tables of FIGS. 2-9, the inventors have found that certain glycol solvents are compatible with insect repellent active ingredients, such as metofluthrin, to volatilize a spatial insect repellent formula within a heat range sufficient for low voltage battery operation and be compatible with various materials of the device 10. In one embodiment, a target temperature range of 60° C.-140° ° C. provides sufficient volatilization of metofluthrin. In one embodiment, the low voltage battery is a lithium ion battery, though any battery energy storage unit may be used and remain within the scope of the invention. In one configuration, the lithium ion battery may be sized in a range of about 2900 mAh to about 3200 mAh though larger or smaller battery sizes or multiple batteries may be used. In this configuration, the battery may have a charge capacity based on an electrical input source of about 5 volts DC and about 1000 mA. A heater associated with the battery and configured to volatize the active ingredient and glycol mix may draw in a range of 3-4 Watts of power. Such a battery may deliver a usage time, before requiring recharging, of up to 6 hours, which is an appropriate time frame for an evening of mosquito protection.

In the development of active ingredient and solvent formulations, glycols, like glycol-related solvents, have physical and chemical characteristics that would not be considered an aspiration hazard. Evaluations of a range of glycol and modified glycol solvents also involved consideration of a variety of materials in contact with these solvents. A glycol ether, dipropylene glycol propyl ether, was found to be incompatible with certain device materials, such as ABS plastics. Another tested solvent was a variation on glycerol, isopropylidene glycerol, which was also incompatible with ABS plastic. As shown in the tables of FIGS. 8 and 9, unmodified glycols were considered to be preferred solvent candidates related to device compatibility. In addition to considerations of the device, solubility of the active ingredients is a significant consideration on several levels. Some of the glycol solvents, such as ethylene glycol and propylene glycol, were not good solvents for some of the insect repellents, particularly prallethrin as shown in FIG. 6. Considerations of not only the solvent material but the concentration levels of particular active ingredients are necessary to create an efficacious formula compatible with heated repeller devices. Some repellents, such as transfluthrin, were found to require higher concentration percentages in the formula, as much as 27%, to be effective outdoors. Incorporating active ingredients at such high levels creates additional solubility challenges which further reduces suitable active ingredient candidates.

Once candidate materials are identified, considerations of whether release rates relative to the selected glycols would be sufficient to deliver good spatial mosquito repellency. In certain test conditions glycerol and tetraethylene glycol have limited release rate capacity relative to metofluthrin and transfluthrin, though may be considered for other pyrethroids. In a preferred embodiment, a formulation of hexylene glycol and dipropylene glycol in combination with metofluthrin provides desired release rates and spatial efficacy for insect repellency outdoors. In this embodiment, the combination of the two glycol solvents to obtain a target release rate ameliorated the observed individual conditions where hexylene glycol by itself volatized too fast and dipropylene glycol was too slow. In one embodiment, an approximate 70:30 solvent ratio of two solvents is provided. In another aspect, the solvent ratio may be a ratio range such as 60-70:40-30, or 65-70:35-30, wherein the sum of specific glycol amounts totals to 100. In a preferred embodiment, summarized below, an approximate ratio of a 66 weight percent Hexylene glycol and 28% weight percent Dipropylene glycol mixed with a 5.5% weight percent of metofluthrin provided desired repellency results.

| Ingredient | Weight percent |
|---|---|
| Metofluthrin (96.65%) | 5.69 (5.5%) |
| Hexylene glycol | 66.02 |
| Dipropylene glycol | 28.29 |

The principle and mode of operation of this invention have been explained and illustrated in its preferred embodiment. However, it must be understood that this invention may be practiced otherwise than as specifically explained and illustrated without departing from its spirit or scope.

What is claimed is:

1. An insect repellent system comprising:

a heating element;

a reservoir containing a mixture of an active insect repellent ingredient comprising one of metofluthrin or transfluthrin and a glycol solvent comprising a mixture of at least a first glycol solvent and a second glycol solvent wherein the first glycol solvent is hexylene glycol and the second glycol solvent is dipropylene glycol; and a wick having a proximal end extending into the heating element and a distal end extending into the mixture.

2. The insect repellent system of claim 1 wherein the active insect repellent active ingredient includes a natural insect repellent comprising at least one of Lemon eucalyptus oil, Lavender, Cinnamon oil, Thyme oil, Greek catmint oil, Soybean oil, Citronella, Tea tree oil, Geraniol, or Neem oil.

3. The insect repellent system of claim 1 wherein the ratio of hexylene glycol to dipropylene glycol is in a range of 65-70 percent hexylene glycol to 35-30 percent dipropylene glycol.

4. The insect repellent system of claim 1 wherein the ratio of hexylene glycol to dipropylene glycol is in a range of 60-70 percent hexylene glycol to 40-30 percent dipropylene glycol.

5. The insect repellent system of claim 1 is configured as a portable insect repellent system powered by a battery and wherein the heating element has a power output in a range of about 3 Watts to about 4 Watts and the battery has a charge capacity of about 2900 mAh to about 3200 mAh.

6. The insect repellent system of claim 1 wherein the reservoir and the heating element are supported in a housing, the housing and the reservoir are formed from thermoplastic materials.

7. The insect repellent system of claim 6 wherein the housing thermoplastic material is an acrylonitrile butadiene styrene (ABS) plastic and a portion of the reservoir is formed from a polycarbonate plastic.

8. The insect repellent system of claim 6 wherein the reservoir includes a sealing element that engages the wick.

9. The insect repellent system of claim 8 wherein the sealing element is a nitrile seal or a nitrile O-ring.

10. The insect repellent system of claim 1 wherein the heating element produces a temperature output in a range sufficient for low voltage battery operation, which may range from about 60 degrees Celsius to about 140 degrees Celsius.

* * * * *